US012340698B2

(12) United States Patent
Shamasundar et al.

(10) Patent No.: US 12,340,698 B2
(45) Date of Patent: Jun. 24, 2025

(54) SYSTEM AND METHOD FOR GENERATING CONFIGURABLE OPTICAL CODES FOR TRANSFERRING AVIONICS DATA

(71) Applicant: HONEYWELL INTERNATIONAL INC., Charlotte, NC (US)

(72) Inventors: Raghu Shamasundar, Bangalore (IN); Kalimulla Khan, Bangalore (IN); Sreenivasan Govindillam, Bangalore (IN); Nathan Krishna Moorthy, Bangalore (IN)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 259 days.

(21) Appl. No.: 17/933,194

(22) Filed: Sep. 19, 2022

(65) Prior Publication Data
US 2024/0021086 A1 Jan. 18, 2024

(30) Foreign Application Priority Data
Jul. 15, 2022 (IN) .............................. 202211040604

(51) Int. Cl.
G08G 5/20 (2025.01)
G06K 7/14 (2006.01)
(52) U.S. Cl.
CPC .............. G08G 5/20 (2025.01); G06K 7/143 (2013.01)
(58) Field of Classification Search
CPC ........................... G08G 5/0004; G06K 7/143
See application file for complete search history.

(56) References Cited

U.S. PATENT DOCUMENTS

| | | | |
|---|---|---|---|
| 8,892,273 B1 * | 11/2014 | Raghu | B64D 43/00 701/3 |
| 10,243,931 B2 | 3/2019 | Latorre-Costa | |
| 2013/0204487 A1 | 8/2013 | Ovens | |
| 2015/0360796 A1 | 12/2015 | Huet et al. | |
| 2021/0122489 A1 | 4/2021 | Maraj et al. | |

FOREIGN PATENT DOCUMENTS

EP 3937153 A1 1/2022

* cited by examiner

Primary Examiner — Alan D Hutchinson
(74) Attorney, Agent, or Firm — Lorenz & Kopf LLP

(57) ABSTRACT

A flight deck system is configured to: receive a data model populated with flight data obtained while performing a core avionics function; receive configuration information from an external source that identifies a specific plurality of flight data items to extract from the data model; extract from the data model data values for the specific plurality of flight data items identified in the configuration information; generate an optical code that encodes the extracted data values; generate an HMI display that provides a selectable link for causing the optical code to be displayed in the aircraft; cause the HMI display to be display on an aircraft display; and cause the optical code to be displayed on an aircraft display responsive to selection of the selectable link; wherein the optical code provides encoded data values corresponding to the specific plurality of flight data items for decoding and display by a mobile device.

20 Claims, 13 Drawing Sheets

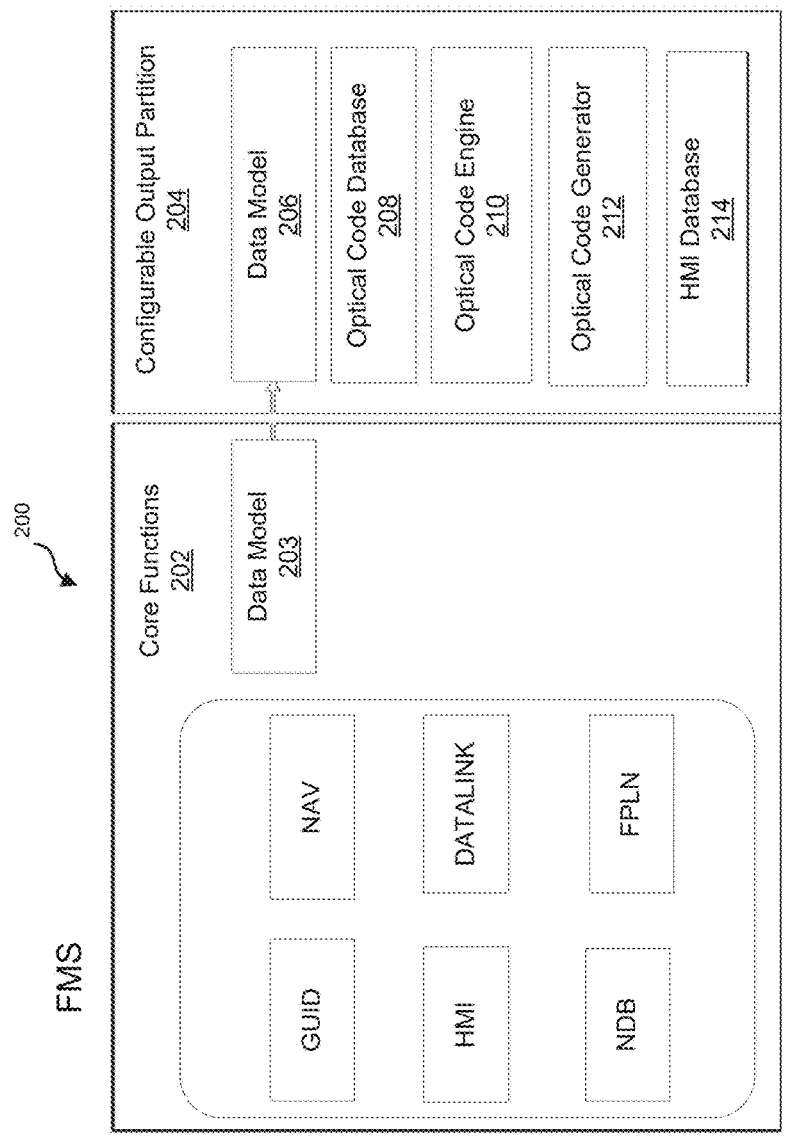

SYSTEM AND METHOD FOR GENERATING CONFIGURABLE OPTICAL CODES FOR TRANSFERRING AVIONICS DATA

CROSS-REFERENCE TO RELATED APPLICATION

This application claims priority to India Provisional Patent Application No. 202211040604, filed Jul. 15, 2022, the entire content of which is incorporated by reference herein.

TECHNICAL FIELD

Embodiments of the subject matter described herein relate generally to a human machine interface (HMI) for providing access to avionics data. More particularly, embodiments of the subject matter relate to systems and methods for using optical codes to provide access to avionics data.

BACKGROUND

Secure and on demand data transfer between onboard and offboard systems in an aircraft cockpit remain a challenge for the current generation of avionics systems. Data bandwidth, pilot training, regulations, work overload, and cyber security are some of the parameters that drive design decisions when designing connected products. Current design efforts focus on electronic means (e.g., Ethernet, Wi-Fi, etc.) of connectivity between avionics and offboard devices. Designing new systems using the electronic means of connectivity can be challenging because of regulatory and cyber concerns and may require significant infrastructure development costs.

Complicating matters further, the avionics data that is needed for connected products may change during the course of a mission. Thus, on demand data transfers may need to be configurable to account for changing avionics data requirements for connected products. As an example, at the end of a mission, a pilot may desire a flight summary or other log, whereas with an event or system fault during the mission, a pilot may need to gather data related to the event to analyze and mitigate problems. Also, information at critical phases like takeoff and landing may need to be accessed for analysis.

Hence, it is desirable to provide improved systems and methods for data transfer between onboard and offboard systems. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a flight deck system (e.g., FMS) is provided that is configured to provide flight information to a mobile device using an optical code. The flight deck system includes a controller that includes a core functions partition and a configurable output partition. The controller is configured to: receive a data model populated with flight data obtained while performing a core avionics function; receive, by the configurable output partition, configuration information from an external source that identifies a specific plurality of flight data items to extract from the data model, wherein the identity of the flight data items for which an optical code is to be generated is configurable by the external source; extract from the data model, by the configurable output partition, data values for the specific plurality of flight data items identified in the configuration information; generate, by the configurable output partition, an optical code that encodes the extracted data values; generate, by the configurable output partition, an HMI (human machine interface) display that provides a selectable link for causing the optical code to be displayed in the aircraft; cause, by the configurable output partition, the HMI display to be displayed on an aircraft display; and cause, by the configurable output partition, the optical code to be displayed on an aircraft display responsive to selection of the selectable link; wherein the optical code provides encoded data values corresponding to the specific plurality of flight data items for decoding and display by a mobile device (e.g., smartphone, Tablet computer, EBB).

In another embodiment, a method in an aircraft for providing flight information to a mobile device using an optical code is disclosed. The method includes: populating a data model with flight data obtained while performing a core avionics function; receiving configuration information from an external source that identifies a specific plurality of flight data items to extract from the data model, wherein the identity of the flight data items for which an optical code is to be generated is configurable by the external source; extracting from the data model data values for the specific plurality of flight data items identified in the database configuration information; generating an optical code that encodes the extracted data values; generating an HMI (human machine interface) display that provides a selectable link for causing the optical code to be displayed in the aircraft; displaying the HMI display on an aircraft display; and displaying the optical code on an aircraft display responsive to selection of the selectable link; wherein the optical code provides encoded data values corresponding to the specific plurality of flight data items for decoding and display by a mobile device (e.g., smartphone, Tablet, EFB).

In another embodiment, a computer-implemented system for exchanging flight information between a flight deck system (e.g., FMS) and a mobile device using an optical code is disclosed. The system includes a controller that includes a core functions partition and a configurable output partition. The controller is configured to: receive a data model populated with flight data obtained while performing a core avionics function; receive, by a configurable output partition, configuration information from an external source that identifies a specific plurality of flight data items to extract from the data model, wherein the identity of the flight data items for which an optical code is to be generated is configurable by the external source; extract from the data model, by the configurable output partition, data values for the specific plurality of flight data items identified in the configuration information; generate, by the configurable output partition, an optical code that encodes the extracted data values; generate, by the configurable output partition, an HMI (human machine interface) display that provides a selectable link for causing the optical code to be displayed in the aircraft; cause, by the configurable output partition, the HMI display to be displayed on an aircraft display; and cause, by the configurable output partition, the optical code to be displayed on an aircraft display responsive to selection of the selectable link; wherein the optical code provides encoded data values corresponding to the specific plurality of flight data items for decoding and display by a mobile device (e.g., smartphone, Tablet, EFB). The system further includes a mobile device that includes a mobile device controller that is configured to: capture, using an optical code reader, a visual image of the displayed optical code; decode, using the visual image, the optical code to identify the encoded data values corresponding to the specific plurality of flight data items; and cause the data values corresponding to the specific plurality of flight data items to be displayed on a display on the mobile device.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein:

FIG. 2A is a block diagram depicting an example controller for exchanging flight information between a flight deck system (e.g., FMS) and an offboard device using an optical code, in accordance with some embodiments;

FIG. 2B is a block diagram depicting an example external source for configuring the configurable output partition, in accordance with some embodiments;

FIG. 2C is a block diagram depicting an example data model, in accordance with some embodiments;

DETAILED DESCRIPTION

Figure 1:
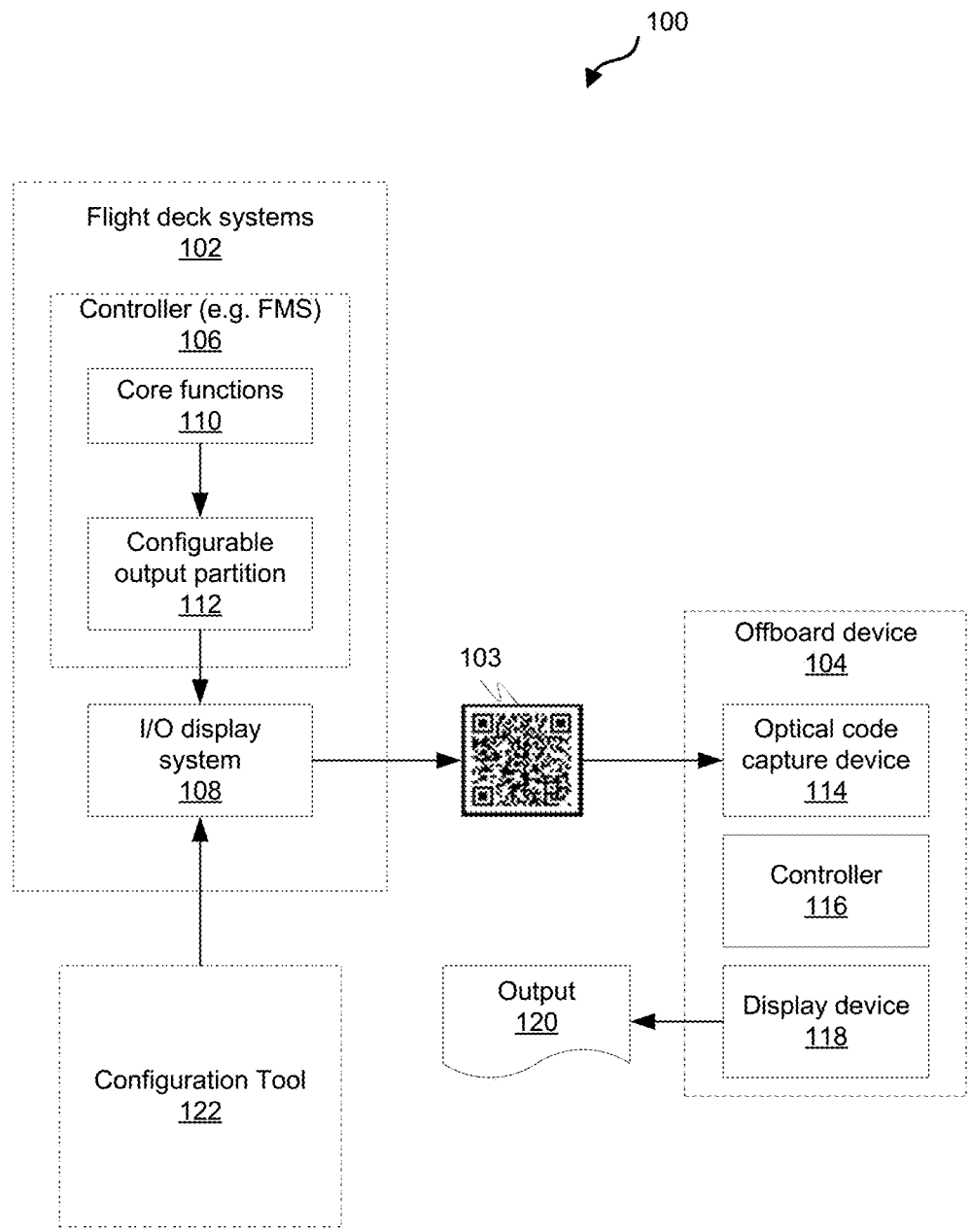
FIG. 1 is a block diagram depicting an example system for exchanging flight information between a flight deck system (e.g., FMS) and an offboard device using an optical code, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing an optically detectable grouping of data for transfer based on a configurable scheme. The data generation capability can be configured at the time of system initialization. Such a transfer scheme is unique as it is faster, safer, secure and pre-configurable. Relying on optical transmission of data can alleviate concerns experienced when using electronic connectivity.

The optical code generation can be configured based on events that typically occur during a mission. A system can monitor for events and, on event occurrence, the associated data can be fetched to form an optically interpretable image. A scanner connected to a receiving system can interpret the current state of avionics.

FIG. 1 is a block diagram depicting an example system 100 for exchanging flight information between a flight deck system (e.g., FMS) and an offboard device, such as a mobile device, using an optical code 103. The example system 100 includes flight deck systems 102 and an offboard device 104. The flight deck systems 102 includes a controller 106 in a flight deck system, such as a flight management system (FMS), and an input/output (I/O) display system 108, such as an electronic flight instrument system (EFIS), Navigation Display (ND), Multifunction Display (MFD), Head-Up Display (HUD) device, and/or Head-Down Display (HDD) device.

The optical code may be a one-dimensional or linear barcode, such as a Universal Product Code (UPC) barcode, that encodes information in a visual, machine-readable form by varying the widths and/or spacings of parallel lines. The optical code may be a two-dimensional or matrix barcode that encodes information in a visual, machine-readable form using squares, rectangles, dots, hexagons or other geometric patterns. The matrix barcode may be a Quick Response code (QR code).

The controller 106 includes a core functions partition 110 and a configurable output partition 112. The core functions partition 110 is configured to provide functions such as in-flight management of the flight plan, in-flight determination of the aircraft's position and the accuracy of that position, providing guidance (e.g., calculating the course to follow), providing a navigation database, providing a human machine interface (HMI), and providing a datalink to external services such as offboard FMS services, weather services, and others. The core functions partition 110 is configured to capture various flight data in a data model.

The configurable output partition 112 is configured for exchanging flight information between a flight deck system (e.g., FMS) and an offboard device, such as a mobile device, using an optical code. The configurable output partition 112 is configured to receive a data model populated with flight data obtained while performing a core avionics function; receive configuration information from an external source 122 that identifies a specific plurality of flight data items to extract from the data model, wherein the identity of the flight data items for which an optical code is to be generated is configurable by the external source 122; extract, from the data model, data values for the specific plurality of flight data items identified in the configuration information; generate an optical code that encodes the extracted data values; generate an HMI (human machine interface) display that provides a selectable link for causing the optical code to be displayed in the aircraft; cause the HMI display to be display on an aircraft display; and cause the optical code to be displayed on an aircraft display responsive to selection of the selectable link; wherein the optical code provides encoded data values corresponding to the specific plurality of flight data items for decoding and display by an offboard device, such as a mobile device (e.g., smartphone, Tablet, EFB).

The example configurable output partition 112 is further configured to receive HMI characteristics from the external source 122 that identify information for formatting the HMI display and store the HMI characteristics in an HMI database. The example configurable output partition 112 is further configured to generate, based on the HMI characteristics stored in the HMI database, the HMI display that provides the selectable link for causing the optical code to be displayed in the aircraft, wherein the HMI characteristics stored in the HMI database are configurable by the external source 122.

In an embodiment, the external source 122 is a configuration tool 122. The configuration tool 122 may be integrated into the offboard device 104 or may be separate from the offboard device 104.

The example offboard device 104 is a portable electronic device (e.g., such as a mobile device, smartphone, tablet computer, laptop computer, electronic flight bag (EFB), and others) carried into the aircraft cockpit by a flight crew member or maintenance personnel. The example offboard device 104 includes an optical code capture device 114 (e.g., a camera), an offboard device controller 116, and a display device 118. The offboard device controller 116 is configured by programming instructions (e.g., an app) to: cause the offboard device 104 to capture, using the optical code capture device 114, a visual image of the displayed optical code; decode the optical code in the visual image to identify the encoded data values corresponding to the specific plurality of flight data items; and display an output 120 containing the data values corresponding to the specific plurality of flight data items on the display device 118 on the offboard device 104. The optical code capture device 114 may, for example, be a camera on a mobile device.

Each of the flight deck equipment controller 106 and the offboard device controller 116 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

FIG. 2A is a block diagram depicting an example controller 200 for exchanging flight information between a flight deck system (e.g., FMS) and a mobile device using an optical code. The example controller includes a core functions partition 202 and a configurable output partition 204. The example controller 200 is incorporated in an FMS, and the core functions partition 202 includes functions performed by an FMS. In this example, the core functions partition 202 is configured to provide functions such as in-flight management of the flight plan, in-flight determination of the aircraft's position and the accuracy of that position, guidance (e.g., calculating the course to follow), a navigation database, a human machine interface (HMI), and a datalink to external services such as offboard FMS services, weather services, and others. The core functions partition 202 is also configured to capture various flight data in a data model 203.

The example configurable output partition 204 includes a data model database 206, an optical code database 208, an optical code engine 210, an optical code generator 212, and an HMI database 214. The data model database 206 is for storing the data model populated with flight data obtained while performing a core avionics function. The optical code database 208 is for storing received configuration information. The optical code engine 210 is configured to extract data values for the specific plurality of flight data items identified in the configuration information from the data model database 206. The optical code generator 212 is configured to generate one or more optical codes that encode the extracted data values.

The example configurable output partition 204 is further configured to receive HMI characteristics from the external source that identifies information for formatting the HMI display. The HMI database 214 is for storing the HMI characteristics received from the external source. The example configurable output partition 204 is configured to generate, based on the HMI characteristics stored in the HMI database, the HMI display that provides the selectable link for causing an optical code to be displayed in the aircraft, wherein the HMI database is configurable by the external source.

FIG. 2B is a block diagram depicting an example external source (in the form of a modifiable database tool 220) for configuring the configurable output partition 204. The modifiable database tool 220 includes an optical code database 222, a data model 224, a custom HMI 226, a configuration table 228, and a logical unit 230. The optical code database 222 is the output from the modifiable database tool 220 and contains the configuration information, generated by the modifiable database tool 220, that is to be provided to the partition to identify the specific plurality of flight data items to extract from the data model 224. The data model 224 identifies the various types of data that can be captured by flight deck equipment in real-time and transferred to offboard systems. The custom HMI 226 includes HMI characteristics for formatting an HMI display. The configuration table 228 contains configuration information for use by the modifiable database tool 220 to allow an aircraft operator (e.g., airline) to identify a specific plurality of flight data items to extract from the data model 224. The logical unit 230 includes at least one processor and a computer-readable storage device or media encoded with programming instructions for configuring the at least one processor.

The example logical unit 230 in the modifiable database tool 220 is configured to generate the optical code database 222 based on the data model 224, aircraft operator specified flight data items, and the configuration table 228. The example logical unit 230 is also configured to provide an interface for the aircraft operator to specify flight data items and an interface for the aircraft operator to provide HMI characteristics. The logical unit 230 is further configured to transfer the generated optical code database to the partition.

FIG. 2C is a block diagram depicting an example data model 240. The example data model 240 provides examples of the type of data items that could be included in a data model. The example data model 240 includes flight plan information, fuel data, wind data, position data, aircraft state information, performance data, landing data, airport data, and other data.

Figure 3:
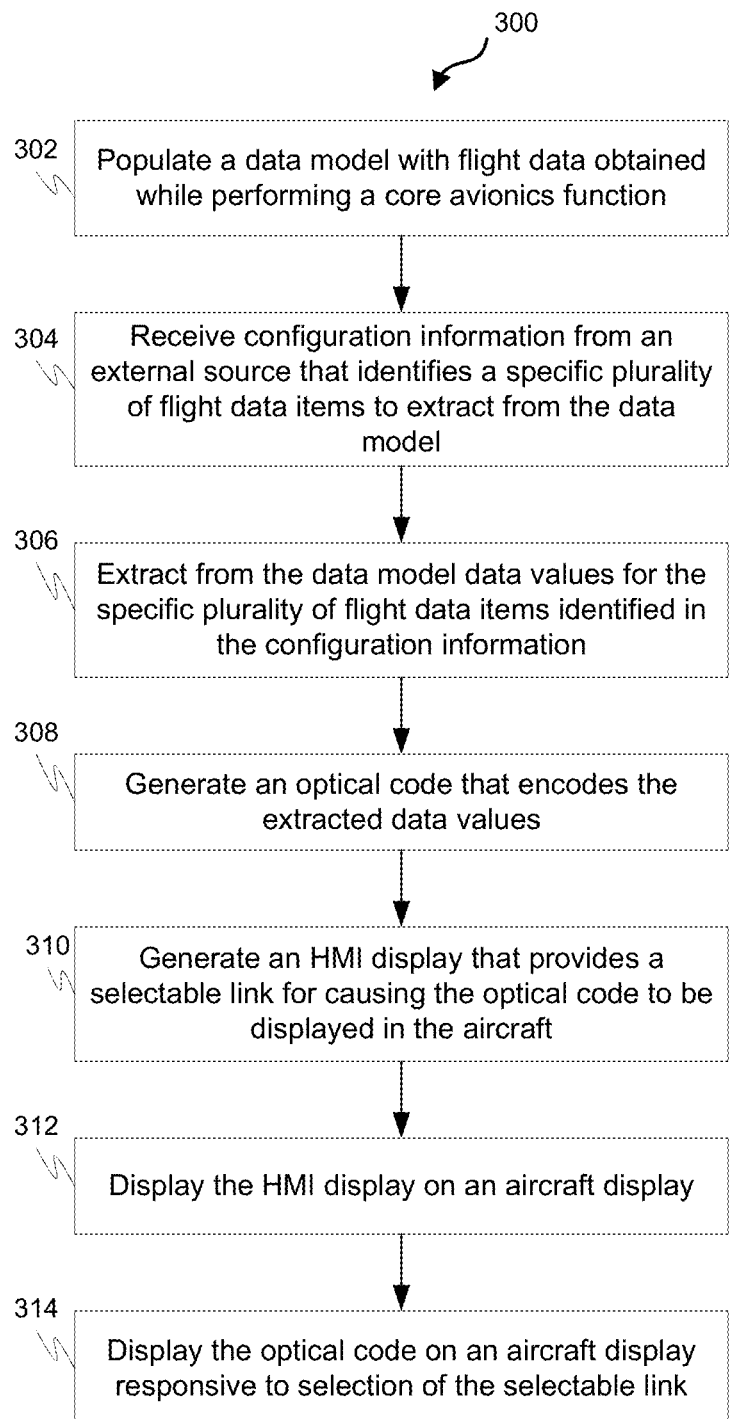
FIG. 3 is a process flow chart depicting an example process for providing flight information to an offboard device using an optical code, in accordance with some embodiments.

FIG. 3 is a process flow chart depicting an example process for providing flight information to a mobile device using an optical code. The order of operation within the process 300 is not limited to the sequential execution as illustrated in the figure, but may be performed in one or more varying orders as applicable and in accordance with the present disclosure.

At 302, the example process 300 includes populating a data model with flight data obtained while performing a core avionics function. The data model may include data such as flight plan information, fuel data, wind data, position data, aircraft state information, performance data, landing data, airport data, and other data.

At 304, the example process 300 includes receiving configuration information from an external source that identifies a specific plurality of flight data items to extract from the data model, wherein the identity of the flight data items for which an optical code is to be generated is configurable by the external source. The example process 300 may further include storing the received configuration information in an optical code database At 306, the example process 300 includes extracting, from the data model, data values for the specific plurality of flight data items identified in the configuration information. Extracting data values may include retrieving the configuration information from the optical code database and extracting the data values for the specific plurality of flight data items identified in the configuration information from the data model database At 308, the example process 300 includes generating an optical code that encodes the extracted data values. The optical code may be a one-dimensional or linear barcode, such as a Universal Product Code (UPC) barcode, that encodes information in a visual, machine-readable form by varying the widths and/or spacings of parallel lines. The optical code may be a two-dimensional or matrix barcode that encodes information in a visual, machine-readable form using squares, rectangles, dots, hexagons or other geometric patterns. The matrix barcode may be a Quick Response code (QR code).

At 310, the example process 300 includes generating an HMI (human machine interface) display that provides a selectable link for causing the optical code to be displayed in the aircraft. The example process 300 may further include receiving HMI characteristics from the external source that identifies information for formatting the HMI display, storing the HMI characteristics received from the external source in an HMI database, and generating, based on the HMI characteristics stored in the HMI database, the HMI display that provides the selectable link for causing the optical code to be displayed in the aircraft.

At 312, the example process 300 includes displaying the HMI display (which includes the selectable link) on an aircraft display. The aircraft display may be an electronic flight instrument system (EFIS), Navigation Display (ND), Multifunction Display (MFD), Head-Up Display (HUD) device, and/or Head-Down Display (HDD) device, or others.

At 314, the example process 300 includes displaying the optical code on an aircraft display responsive to selection of the selectable link. The optical code provides encoded data values corresponding to the specific plurality of flight data items. An offboard device, such as a mobile device (e.g., smartphone, Tablet, EBB), may decode the optical code to recover, display, and/or use the specific plurality of flight data items.

Figure 4:
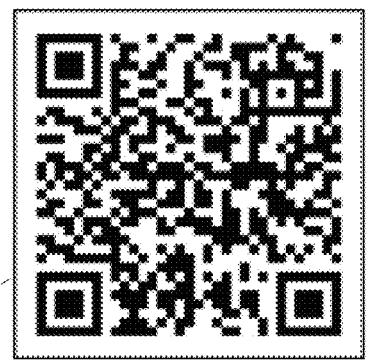
FIG. 4 is a diagram that illustrates example HMI display screens that may be presented by an example flight deck system that is configured to provide flight information to a mobile device using an optical code, in accordance with some embodiments.

FIG. 4 illustrates example HMI display screens that may be presented by an example flight deck system that is configured to provide flight information to a mobile device using an optical code. Depicted are example HMI display screens 400 and 410. Example HMI display screen 400 displays example flight data that may be provided by the flight deck system and also includes a selectable link 402 for causing an optical code that is encoded with flight data to be displayed. Example HMI display screen 410 displays an example optical code 412, in the form of a QR code, that can be displayed responsive to selection of the selectable link 402.

Figure 5:
FIG. 5 illustrates example HMI display screens that may be presented by an example computer-implemented system for exchanging flight information between a flight deck system and a mobile device using an optical code, in accordance with some embodiments.

FIG. 5 illustrates example HMI display screens that may be presented by an example computer-implemented system for exchanging flight information between a flight deck system and a mobile device using an optical code. Depicted are example HMI display screens 500, 510, and 520. Example HMI display screen 500 displays example selectable links 502a-502j that may be provided by the flight deck system for selection of an optical code for display that is encoded with specialized flight data. Selectable link 502g, which is directed to maintenance log data in this example, has been selected, which results in an optical code 512 being displayed in HMI display screen 510. Example HMI display screen 510 displays an example optical code 512, in the form of a QR code, that is encoded with maintenance log data and that can be displayed responsive to selection of the selectable link 502g. Example HMI display screen 520 displays an app operating on a mobile device 522 and having a region 524 for displaying the optical code 512 that is input to the app on the mobile device 522.

Figure 6:
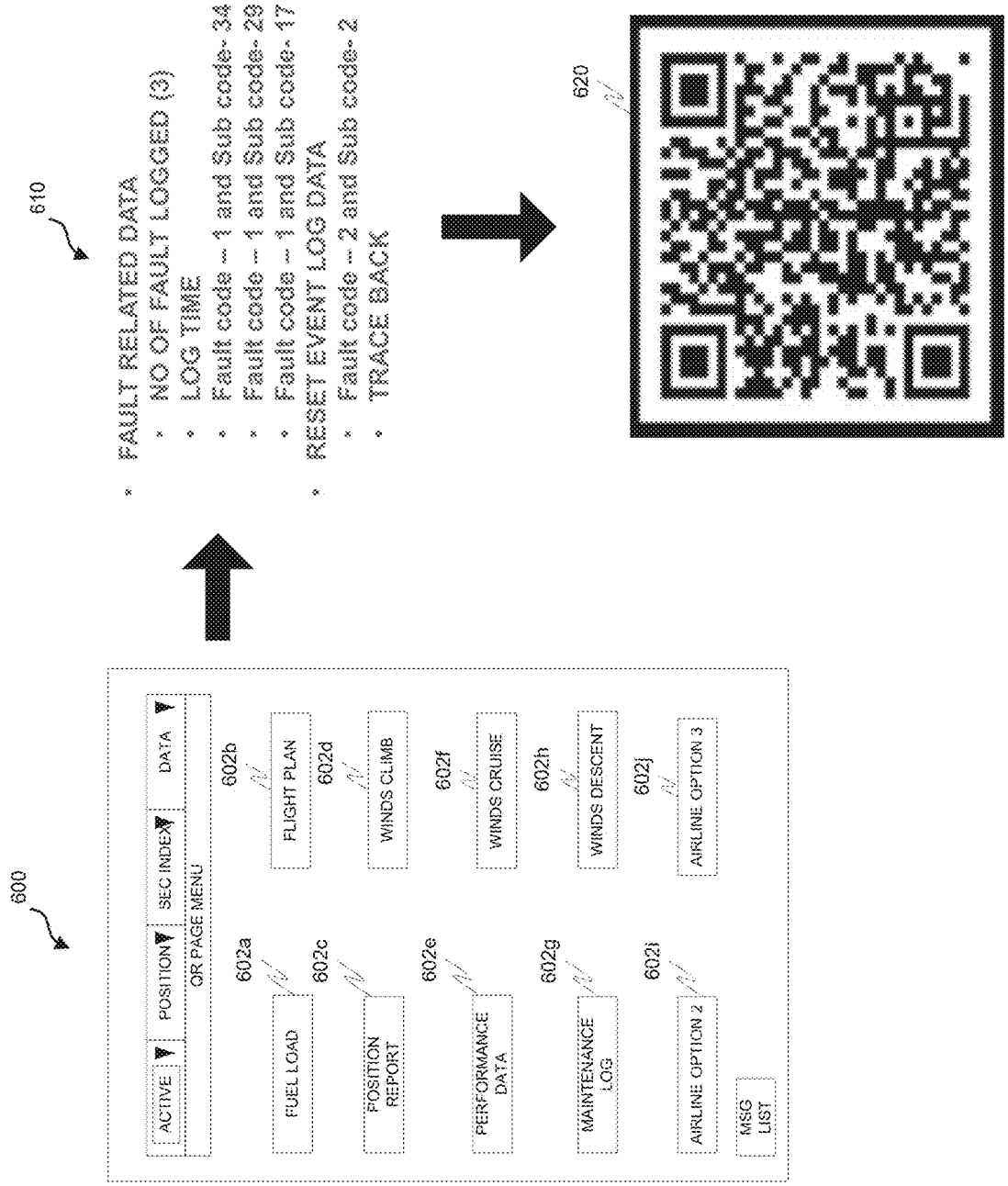
FIG. 6 is a flow diagram illustrating an example generation of an optical code for maintenance log data, in accordance with some embodiments.

FIG. 6 is a flow diagram depicting an example generation of an optical code for maintenance log data. Depicted are example HMI display screen 600, data 610 to be encoded into an optical code, and an optical code 620 that is encoded with the data 610. Example HMI display screen 600 displays example selectable links 602a-602j that may be provided by the flight deck system for selection of an optical code for display that is encoded with specialized flight data. Selectable link 602g, which is directed to maintenance log data in this example, has been selected. Data 610 are example maintenance log data that are encoded into optical code 620.

Figure 7:
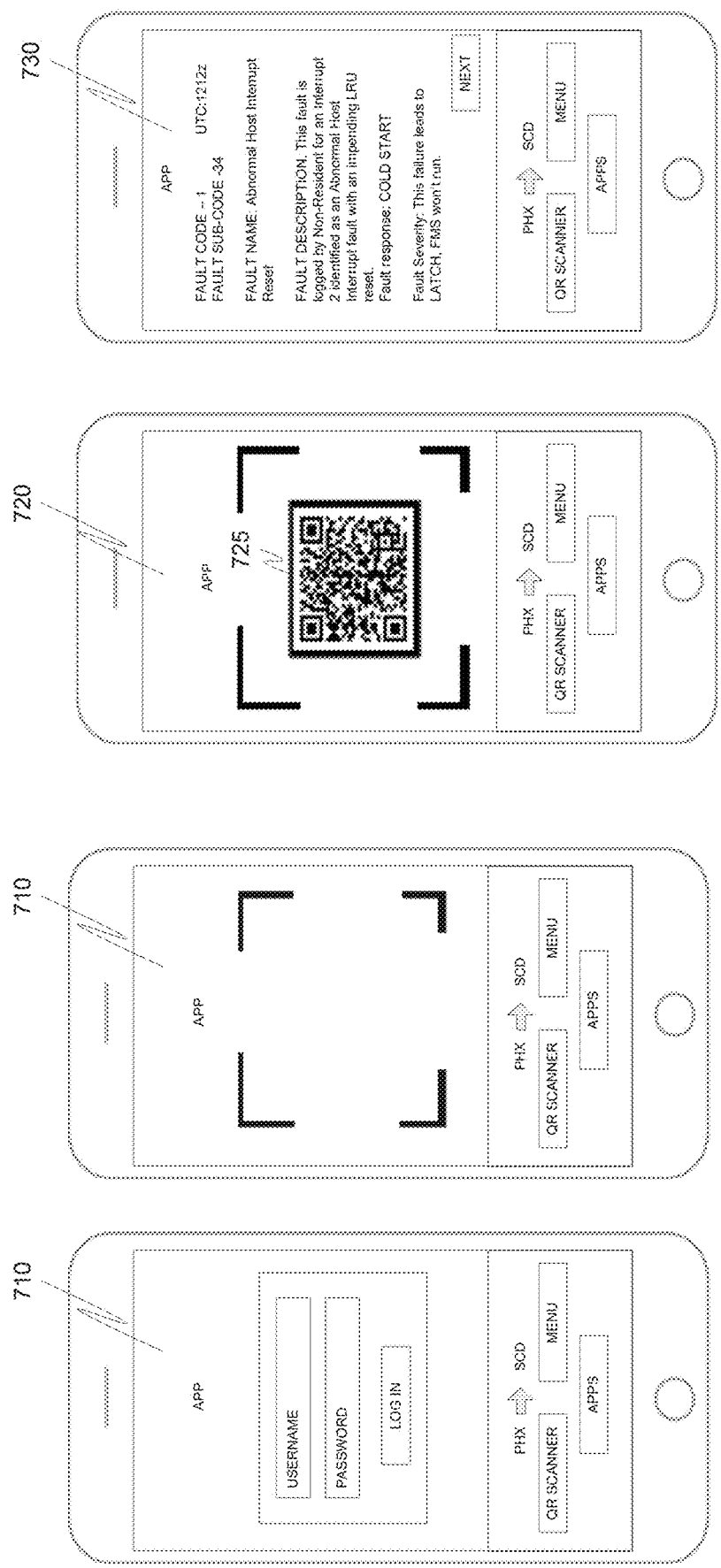
FIG. 7 illustrates example HMI display screens that may be presented by an example mobile device at various stages in a process of displaying fault related data transferred by a flight deck system to the mobile device using an optical code, in accordance with some embodiments.

FIG. 7 illustrates example HMI display screens that may be presented by an example mobile device at various stages in a process of displaying fault related data transferred by a flight deck system to the mobile device using an optical code. HMI display screen 700 displays an example login screen for an app that displays data transferred by a flight deck system. HMI display screen 710 displays an example screen prior to scanning an optical code. HMI display screen 720 displays an example screen while an optical code 725 is being scanned. HMI display screen 730 displays an example screen of data that has been decoded from the optical code.

Figure 8:
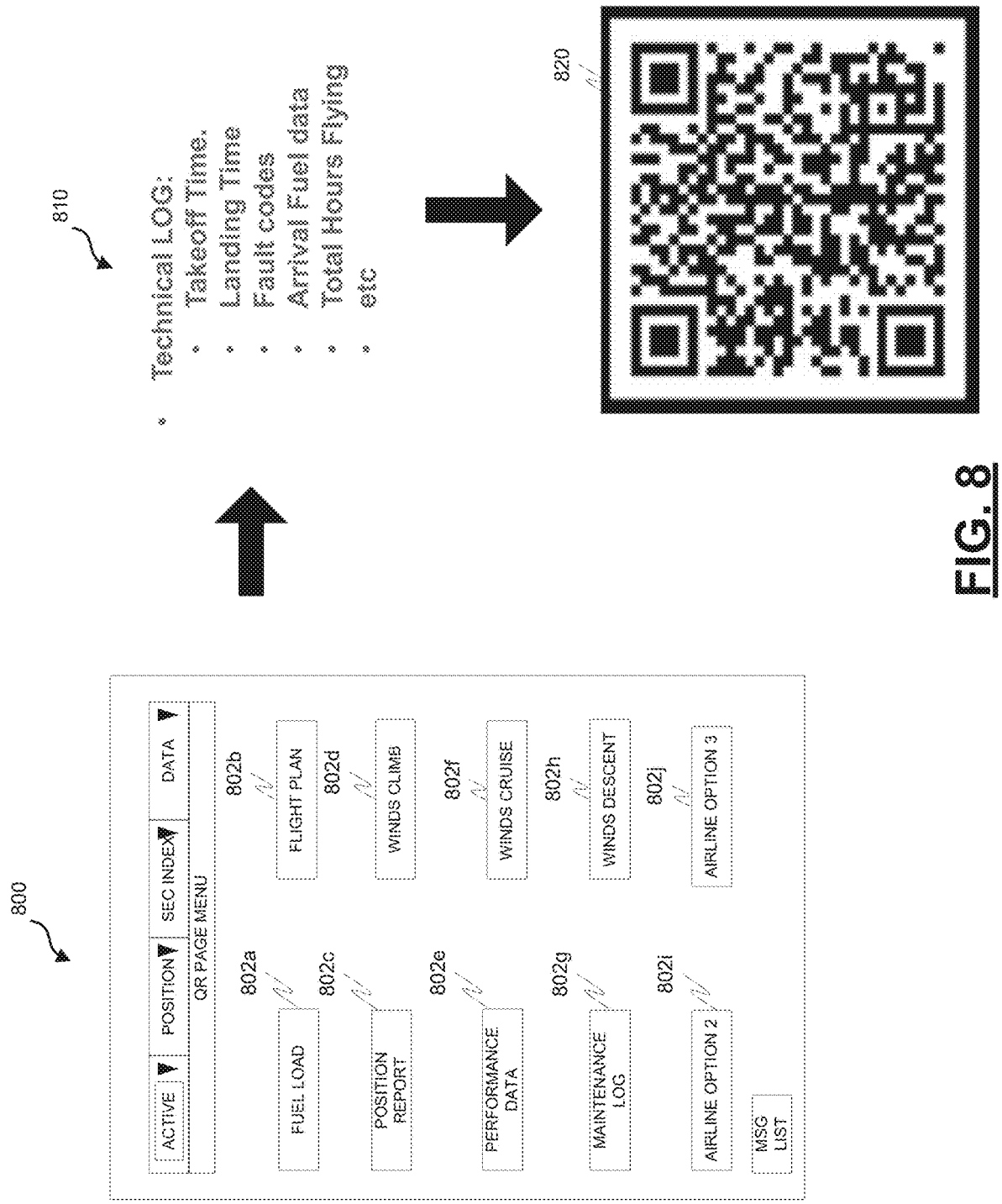
FIG. 8 is a flow diagram illustrating an example generation of an optical code for technical log data, in accordance with some embodiments.

FIG. 8 is a flow diagram depicting an example generation of an optical code for technical log data. Depicted are example HMI display screen 800, data 810 to be encoded into an optical code, and an optical code 820 that is encoded with the data 810. Example HMI display screen 800 displays example selectable links 802a-802j that may be provided by the flight deck system for selection of an optical code for display that is encoded with specialized flight data. Selectable link 802i, which is directed to technical log data in this example, has been selected. Data 810 are example technical log data that are encoded into optical code 820.

Figure 9:
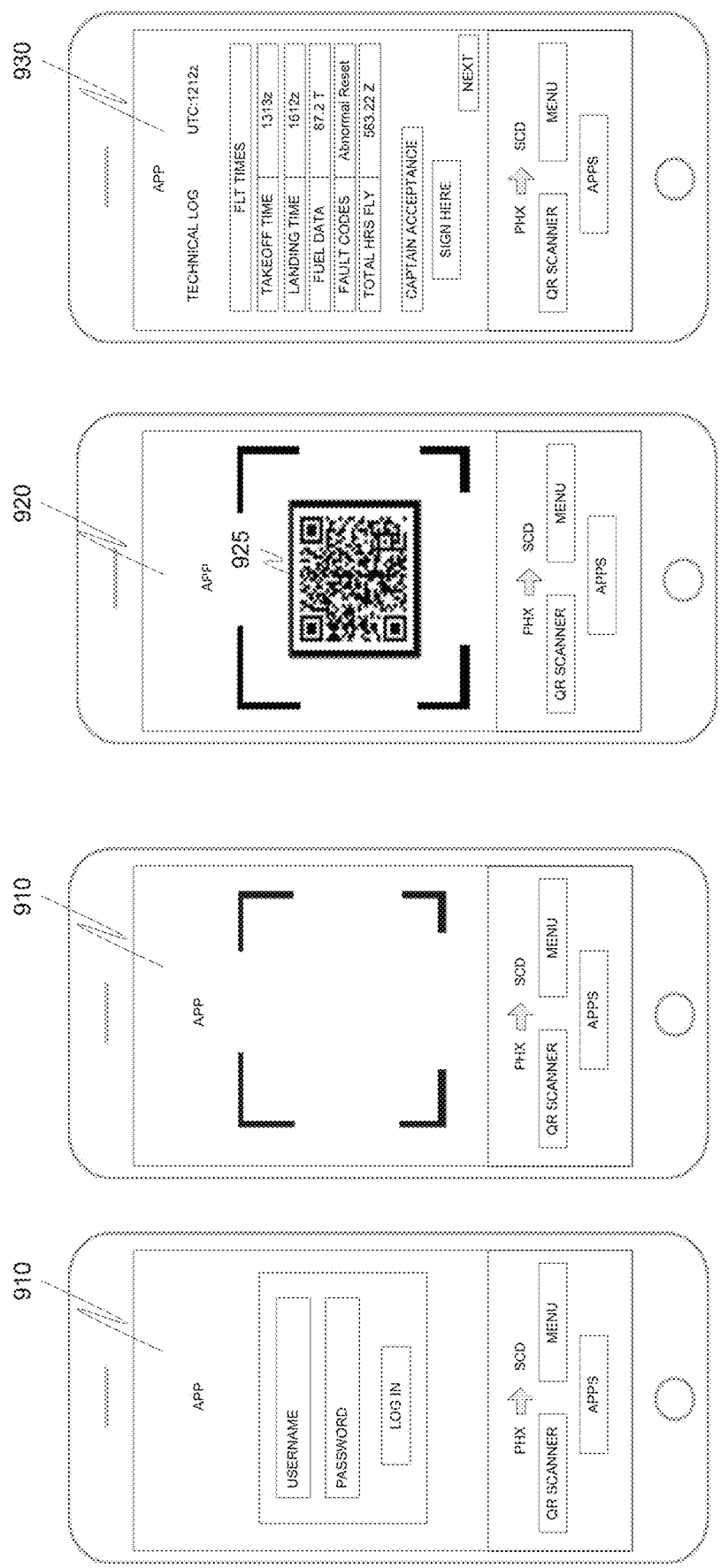
FIG. 9 illustrates example HMI display screens that may be presented by an example mobile device at various stages in a process of displaying technical log data transferred by a flight deck system to the mobile device using an optical code, in accordance with some embodiments.

FIG. 9 illustrates example HMI display screens that may be presented by an example mobile device at various stages in a process of displaying technical log data transferred by a flight deck system to the mobile device using an optical code. HMI display screen 900 displays an example login screen for an app that displays data transferred by a flight deck system. HMI display screen 910 displays an example screen prior to scanning an optical code. HMI display screen 920 displays an example screen while an optical code 925 is being scanned. HMI display screen 930 displays an example screen of data that has been decoded from the optical code.

Figure 10:
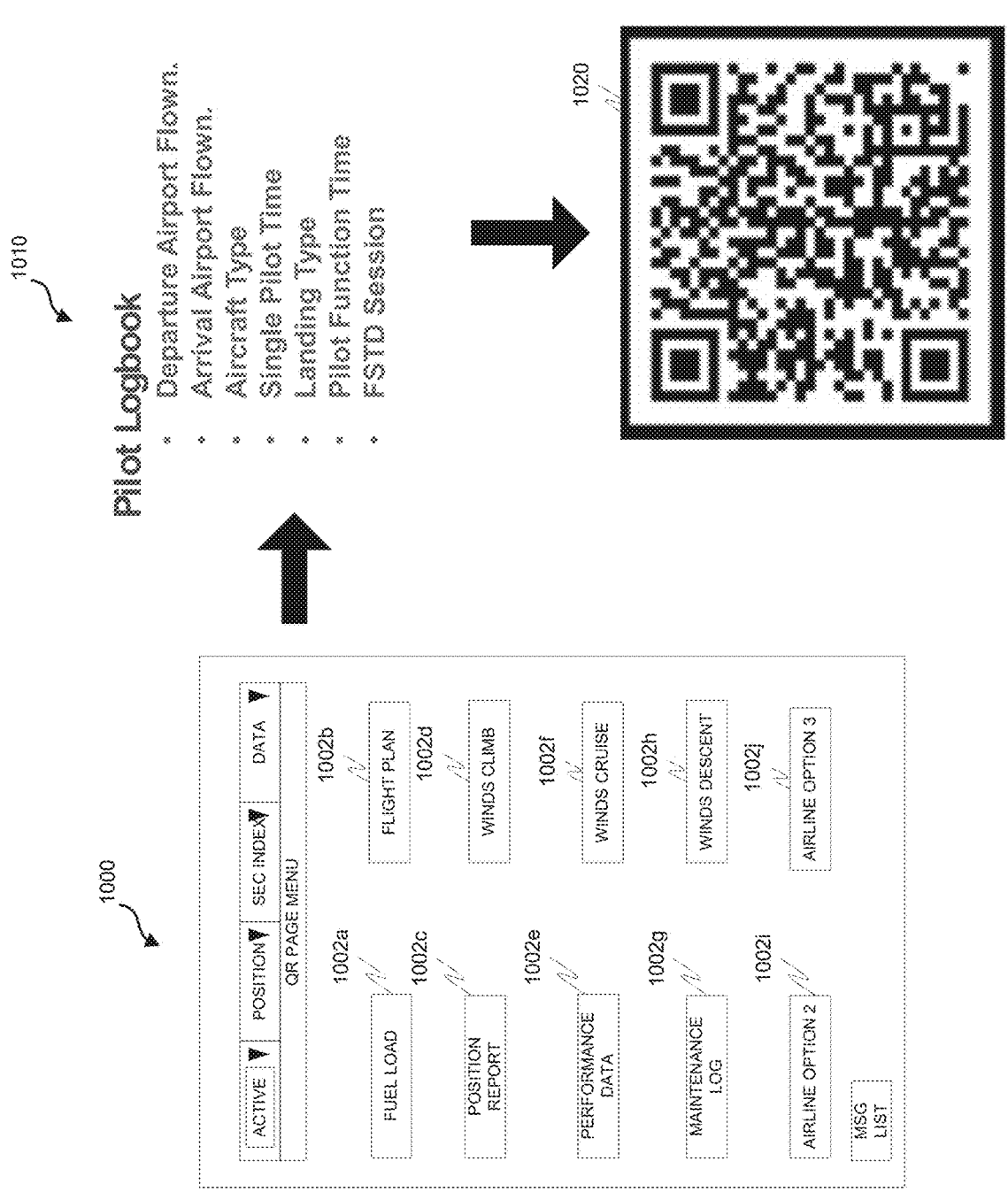
FIG. 10 is a flow diagram illustrating an example generation of an optical code for pilot log book data, in accordance with some embodiments.

FIG. 10 is a flow diagram depicting an example generation of an optical code for pilot log book data. Depicted are example HMI display screen 1000, data 1010 to be encoded into an optical code, and an optical code 1020 that is encoded with the data 1010. Example HMI display screen 1000 displays example selectable links 1002a-1002j that may be provided by the flight deck system for selection of an optical code for display that is encoded with specialized flight data. Selectable link 1002i, which is directed to pilot logbook data in this example, has been selected. Data 1010 are example pilot logbook data that are encoded into optical code 1020.

Figure 11:
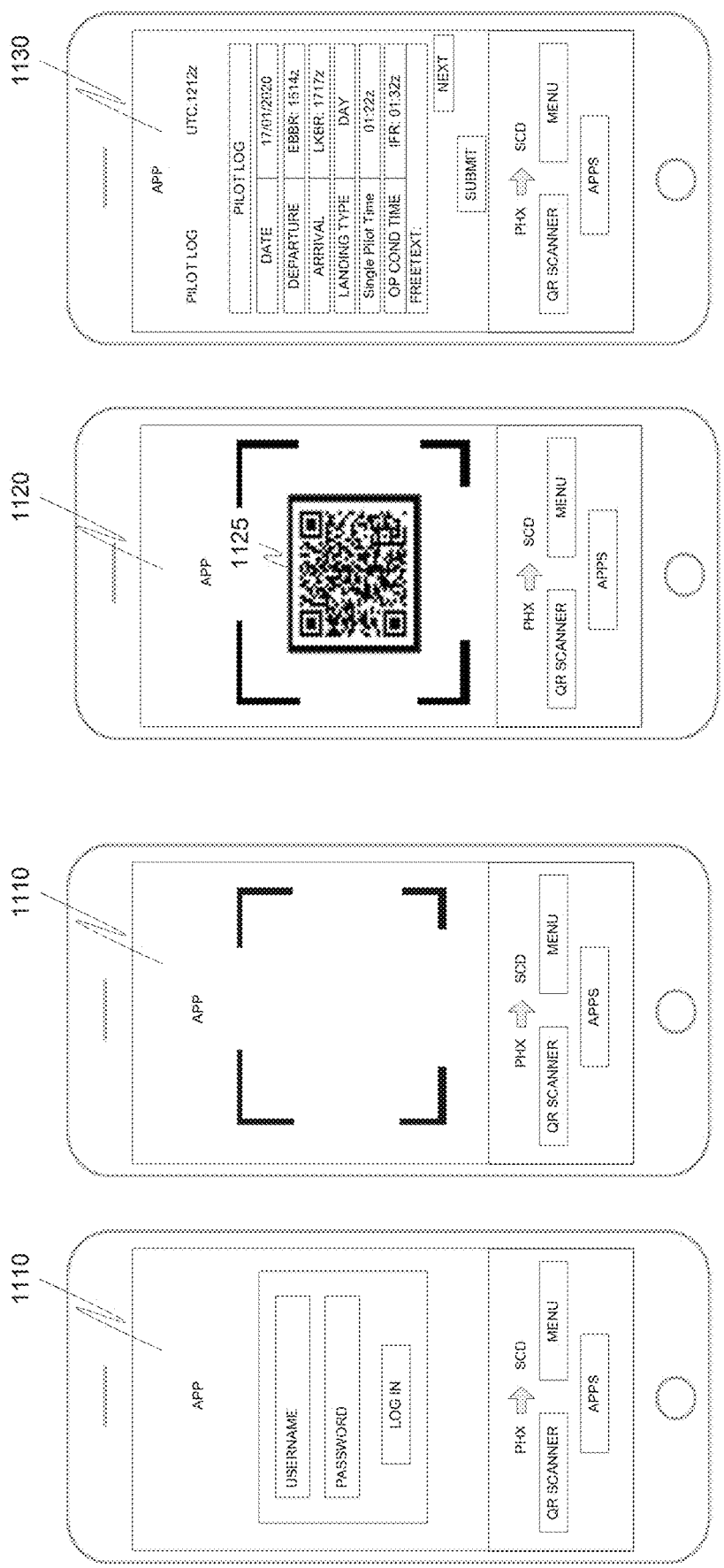
FIG. 11 illustrates example HMI display screens that may be presented by an example mobile device at various stages in a process of displaying pilot log data transferred by a flight deck system to the mobile device using an optical code, in accordance with some embodiments.

FIG. 11 illustrates example HMI display screens that may be presented by an example mobile device at various stages in a process of displaying pilot log data transferred by a flight deck system to the mobile device using an optical code. HMI display screen 1100 displays an example login screen for an app that displays data transferred by a flight deck system. HMI display screen 1110 displays an example screen prior to scanning an optical code. HMI display screen 1120 displays an example screen while an optical code 1125 is being scanned. HMI display screen 1130 displays an example screen of data that has been decoded from the optical code.

Figure 12:
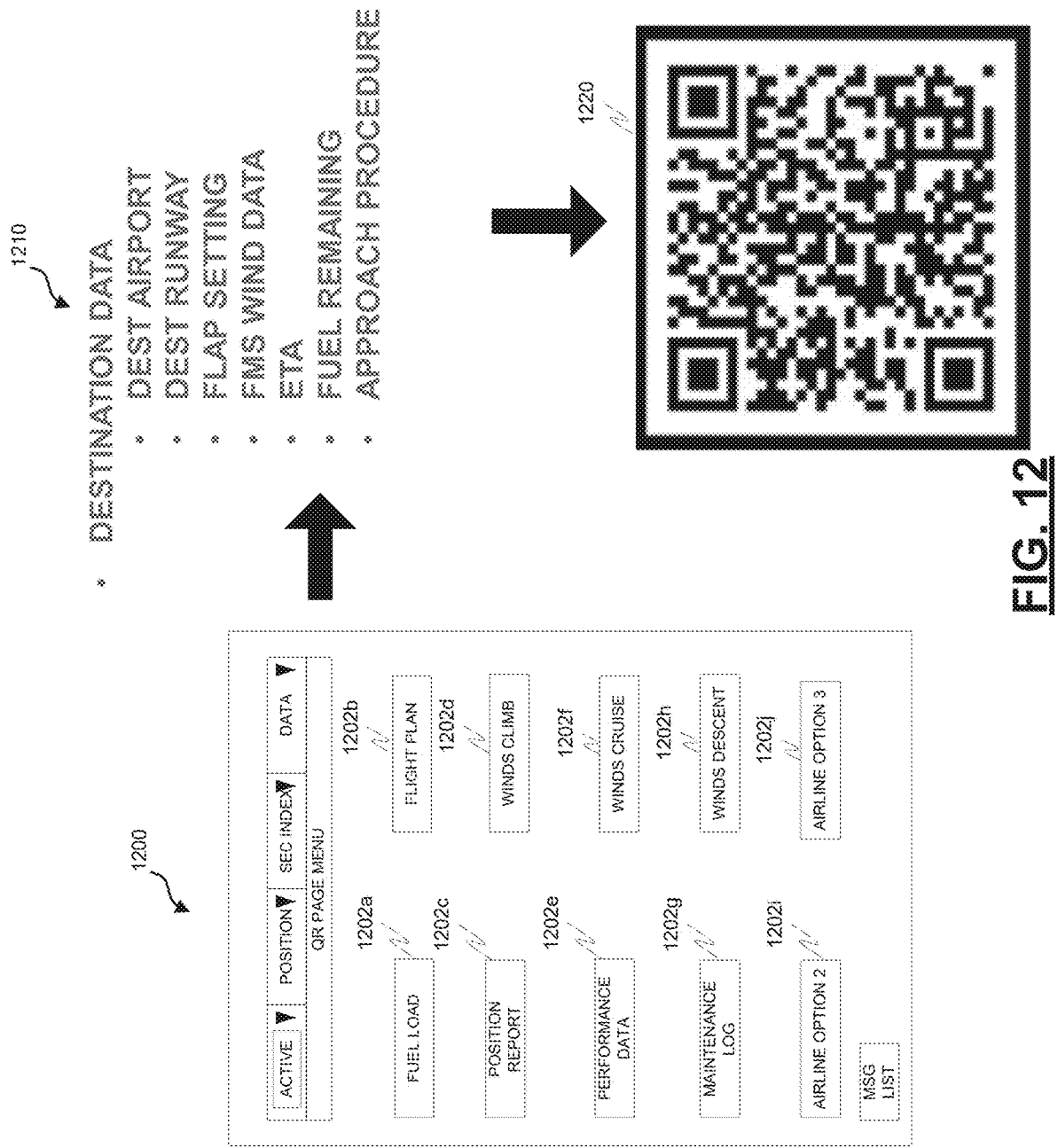
FIG. 12 is a flow diagram illustrating an example generation of an optical code for destination data, in accordance with some embodiments.

FIG. 12 is a flow diagram depicting an example generation of an optical code for destination data. Depicted are example HMI display screen 1200, data 1210 to be encoded into an optical code, and an optical code 1220 that is encoded with the data 1210. Example HMI display screen 1200 displays example selectable links 1202a-1202j that may be provided by the flight deck system for selection of an optical code for display that is encoded with specialized flight data. Selectable link 1202i, which is directed to destination data in this example, has been selected. Data 1210 are example destination data that are encoded into optical code 1220.

Figure 13:
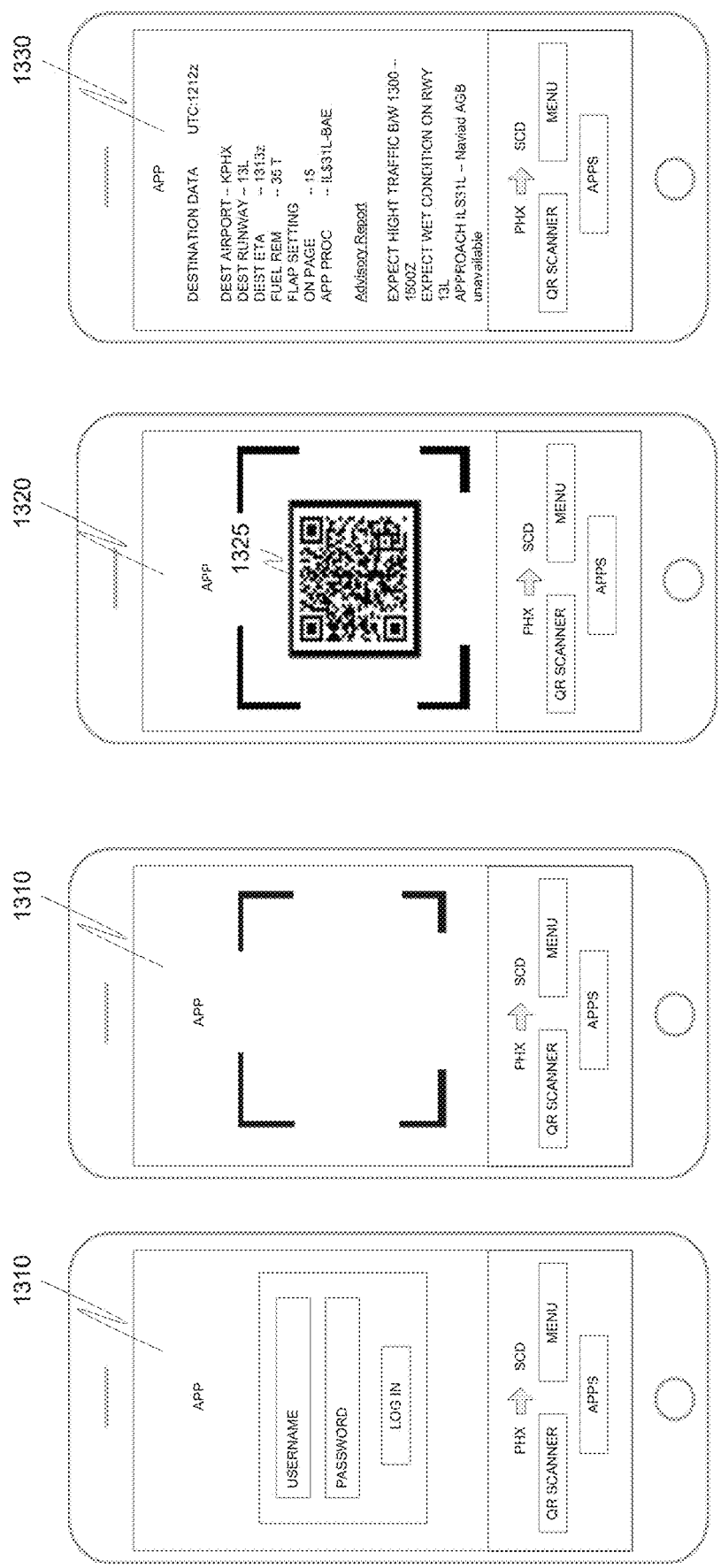
FIG. 13 illustrates example HMI display screens that may be presented by an example mobile device at various stages in a process of displaying destination data transferred by a flight deck system to the mobile device using an optical code, in accordance with some embodiments.

FIG. 13 illustrates example HMI display screens that may be presented by an example mobile device at various stages in a process of displaying destination data transferred by a flight deck system to the mobile device using an optical code. HMI display screen 1300 displays an example login screen for an app that displays data transferred by a flight deck system. HMI display screen 1310 displays an example screen prior to scanning an optical code. HMI display screen 1320 displays an example screen while an optical code 1325 is being scanned. HMI display screen 1330 displays an example screen of data that has been decoded from the optical code.

Described herein are apparatus, systems, techniques and articles for using an optical code, such as a QR code, as media to transfer data from an onboard flight deck equipment to offboard equipment. In one embodiment, a flight deck system (e.g., FMS) is provided that is configured to provide flight information to a mobile device using an optical code. The flight deck system includes a controller that includes a core functions partition and a configurable output partition. The controller is configured to: receive a data model populated with flight data obtained while performing a core avionics function; receive, by the configurable output partition, configuration information from an external source that identifies a specific plurality of flight data items to extract from the data model, wherein the identity of the flight data items for which an optical code is to be generated is configurable by the external source; extract from the data model, by the configurable output partition, data values for the specific plurality of flight data items identified in the configuration information; generate, by the configurable output partition, an optical code that encodes the extracted data values; generate, by the configurable output partition, an HMI (human machine interface) display that provides a selectable link for causing the optical code to be displayed in the aircraft; cause, by the configurable output partition, the HMI display to be display on an aircraft display; and cause, by the configurable output partition, the optical code to be displayed on an aircraft display responsive to selection of the selectable link; wherein the optical code provides encoded data values corresponding to the specific plurality of flight data items for decoding and display by a mobile device (e.g., smartphone, Tablet computer, EFB).

These aspects and other embodiments may include one or more of the following features. The configurable output partition may include a data model database and the controller may be configured to store the data model populated with flight data obtained while performing a core avionics function in the data model database. The configurable output partition may include an optical code database and the controller may be configured to store the received configuration information in the optical code database. The configurable output partition may include an optical code engine for extracting the data values for the specific plurality of flight data items identified in the configuration information from the data model database. The controller may be further configured to receive HMI characteristics from the external source that identifies information for formatting the HMI display. The configurable output partition may include an HMI database and the controller may be further configured to store the HMI characteristics received from the external source in the HMI database. The controller may be configured to generate, based on the HMI characteristics stored in the HMI database, the HMI display that provides the selectable link for causing the optical code to be displayed in the aircraft, wherein the HMI database is configurable by the external source. The configurable output partition may include an optical code generator configured to generate the optical code that encodes the extracted data values. The optical code may include a one-dimensional or linear barcode that encodes information by varying the widths and/or spacings of parallel lines. The optical code may include a two-dimensional or matrix barcode that encodes information using squares, rectangles, dots, hexagons or other geometric patterns. The matrix barcode may be a Quick Response code (QR code).

In another embodiment, a method in an aircraft for providing flight information to a mobile device using an optical code is disclosed. The method includes: populating a data model with flight data obtained while performing a core avionics function; receiving configuration information from an external source that identifies a specific plurality of flight data items to extract from the data model, wherein the identity of the flight data items for which an optical code is to be generated is configurable by the external source; extracting from the data model data values for the specific plurality of flight data items identified in the configuration information; generating an optical code that encodes the extracted data values; generating an HMI (human machine interface) display that provides a selectable link for causing the optical code to be displayed in the aircraft; displaying the HMI display on an aircraft display; and displaying the optical code on an aircraft display responsive to selection of the selectable link; wherein the optical code provides encoded data values corresponding to the specific plurality of flight data items for decoding and display by a mobile device (e.g., smartphone, Tablet, EFB).

These aspects and other embodiments may include one or more of the following features. The method may further include storing the data model in a data model database. The method may further include storing the received configuration information in an optical code database. Extracting, from the data model, data values for the specific plurality of flight data items identified in the configuration information may include retrieving the configuration information from the optical code database and extracting the data values for the specific plurality of flight data items identified in the configuration information from the data model database. The method may further include receiving HMI characteristics from the external source that identifies information for formatting the HMI display. The method may further include storing the HMI characteristics received from the external source in an HMI database. The method may further include generating, based on the HMI characteristics stored in the HMI database, the HMI display that provides the selectable link for causing the optical code to be displayed in the aircraft, wherein the HMI database is configurable by the external source. The optical code may include a two-dimensional or matrix barcode that encodes information using squares, rectangles, dots, hexagons or other geometric patterns. The matrix barcode may be a Quick Response code (QR code). The optical code may include a one-dimensional or linear barcode that encodes information by varying the widths and/or spacings of parallel lines.

In another embodiment, a computer-implemented system for exchanging flight information between a flight deck system (e.g., FMS) and a mobile device using an optical code is disclosed. The system includes a controller that includes a core functions partition and a configurable output partition. The controller is configured to: receive a data model populated with flight data obtained while performing a core avionics function; receive, by a configurable output partition, configuration information from an external source that identifies a specific plurality of flight data items to extract from the data model, wherein the identity of the flight data items for which an optical code is to be generated is configurable by the external source; extract from the data model, by the configurable output partition, data values for the specific plurality of flight data items identified in the configuration information; generate, by the configurable output partition, an optical code that encodes the extracted data values; generate, by the configurable output partition, an HMI (human machine interface) display that provides a selectable link for causing the optical code to be displayed in the aircraft; cause, by the configurable output partition, the HMI display to be display on an aircraft display; and cause, by the configurable output partition, the optical code to be displayed on an aircraft display responsive to selection of the selectable link; wherein the optical code provides encoded data values corresponding to the specific plurality of flight data items for decoding and display by a mobile device (e.g., smartphone, Tablet, EFB). The system further includes a mobile device that includes a mobile device controller that is configured to: capture, using an optical code reader, a visual image of the displayed optical code; decode, using the visual image, the optical code to identify the encoded data values corresponding to the specific plurality of flight data items; and cause the data values corresponding to the specific plurality of flight data items to be displayed on a display on the mobile device.

These aspects and other embodiments may include one or more of the following features. The optical code reader may be a camera on the mobile device. The configurable output partition may include a data model database and the controller may be configured to store the data model populated with flight data obtained while performing a core avionics function in the data model database. The configurable output partition may include an optical code database and the controller may be configured to store the received configuration information in the optical code database. The configurable output partition may include an optical code engine for extracting the data values for the specific plurality of flight data items identified in the configuration information from the data model database. The controller may be further configured to receive HMI characteristics from the external source that identifies information for formatting the HMI display. The configurable output partition may include an HMI database and the controller may be further configured to store the HMI characteristics received from the external source in the HMI database. The controller may be configured to generate, based on the HMI characteristics stored in the HMI database, the HMI display that provides the selectable link for causing the optical code to be displayed in the aircraft, wherein the HMI database is configurable by the external source. The configurable output partition may include an optical code generator configured to generate the optical code that encodes the extracted data values. The optical code may include a one-dimensional or linear barcode that encodes information by varying the widths and/or spacings of parallel lines. The optical code may include a two-dimensional or matrix barcode that encodes information using squares, rectangles, dots, hexagons or other geometric patterns. The matrix barcode may be a Quick Response code (QR code).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system configured to provide flight information to a mobile device using an optical code, the flight deck system comprising a controller configured to:
  receive a data model populated with flight data obtained while performing a core avionics function;
  receive, by a configurable output partition, configuration information from the mobile device that identifies a specific subset of less than all flight data items in the data model to extract from the data model;
  extract from the data model, by the configurable output partition, data values for the specific subset of flight data items identified in the configuration information;
  generate, by the configurable output partition, an optical code that encodes the extracted data values corresponding to the specific subset of flight data items specified by the mobile device;
  generate, by the configurable output partition, an HMI (human machine interface) display that provides a selectable link for causing the generated optical code to be displayed on an aircraft display;
  cause, by the configurable output partition, the HMI display to be displayed on an aircraft display; and
  cause, by the configurable output partition, the generated optical code to be displayed on an aircraft display responsive to selection of the selectable link;
  wherein the generated optical code provides encoded data values corresponding to the specific subset of flight data items specified by the mobile device for decoding and display by the mobile device.

2. The flight deck system of claim 1, wherein the configurable output partition includes a data model database and the controller is configured to store the data model populated with flight data obtained while performing a core avionics function in the data model database.

3. The flight deck system of claim 2, wherein the configurable output partition includes an optical code database and the controller is configured to store the received configuration information in the optical code database.

4. The flight deck system of claim 3, wherein the configurable output partition includes an optical code engine for extracting the data values for the specific subset of flight data items identified in the configuration information from the data model database.

5. The flight deck system of claim 1, wherein the controller is further configured to receive HMI characteristics from the mobile device that identifies information for formatting the HMI display.

6. The flight deck system of claim 5, wherein the configurable output partition includes an HMI database and the controller is further configured to store the HMI characteristics received from the mobile device in the HMI database.

7. The flight deck system of claim 6, wherein the controller is configured to generate, based on the HMI characteristics stored in the HMI database, the HMI display that provides the selectable link for causing the generated optical code to be displayed in the aircraft, wherein the HMI database is configurable by the mobile device.

8. The flight deck system of claim 1, wherein the configurable output partition includes an optical code generator configured to generate the optical code that encodes the extracted data values.

9. The flight deck system of claim 1, wherein the generated optical code comprises a one-dimensional or linear barcode that encodes information by varying widths and/or spacings of parallel lines.

10. The flight deck system of claim 1, wherein the generated optical code comprises a two-dimensional or matrix barcode that encodes information using squares, rectangles, dots, hexagons or other geometric patterns.

11. The flight deck system of claim 10, wherein the matrix barcode comprises a Quick Response code (QR code).

12. A method in an aircraft for providing flight information to a mobile device using an optical code, the method comprising:
  populating a data model with flight data obtained while performing a core avionics function;
  receiving configuration information from the mobile device that identifies a specific subset of less than all flight data items in the data model to extract from the data model;
  extracting, from the data model, data values for the specific subset of flight data items identified in the configuration information;
  generating an optical code that encodes the extracted data values corresponding to the specific subset of flight data items specified by the mobile device;
  generating an HMI (human machine interface) display that provides a selectable link for causing the generated optical code to be displayed in the aircraft;
  displaying the HMI display on an aircraft display; and
  displaying the generated optical code on an aircraft display responsive to selection of the selectable link;
  wherein the generated optical code provides encoded data values corresponding to the specific subset of flight data items specified by the mobile device for decoding and display by the mobile device.

13. The method of claim 12, further comprising storing the data model in a data model database.

14. The method of claim 13, further comprising storing the received configuration information in an optical code database.

15. The method of claim 14, wherein extracting, from the data model, data values for the specific subset of flight data items identified in the configuration information comprises retrieving the configuration information from the optical code database and extracting the data values for the specific subset of flight data items identified in the configuration information from the data model database.

16. The method of claim 12, further comprising receiving HMI characteristics from the mobile device that identifies information for formatting the HMI display.

17. The method of claim 16, further comprising storing the HMI characteristics received from the mobile device in an HMI database.

18. The method of claim 17, further comprising generating, based on the HMI characteristics stored in the HMI database, the HMI display that provides the selectable link for causing the generated optical code to be displayed in the aircraft, wherein the HMI database is configurable by the mobile device.

19. The method of claim 12, wherein the generated optical code comprises a Quick Response code (QR code).

20. A computer-implemented system for exchanging flight information between a flight deck system and a mobile device using an optical code, the system comprising:
  a controller configured to:
    receive a data model populated with flight data obtained while performing a core avionics function;

receive, by a configurable output partition, configuration information from the mobile device that identifies a specific subset of less than all flight data items in the data model to extract from the data model;

extract from the data model, by the configurable output partition, data values for the specific subset of flight data items identified in the configuration information;

generate, by the configurable output partition, an optical code that encodes the extracted data values corresponding to the specific subset of flight data items specified by the mobile device;

generate, by the configurable output partition, an HMI (human machine interface) display that provides a selectable link for causing the generated optical code to be displayed on an aircraft display;

cause, by the configurable output partition, the HMI display to be display on an aircraft display; and cause, by the configurable output partition, the generated optical code to be displayed on an aircraft display responsive to selection of the selectable link;

wherein the generated optical code provides encoded data values corresponding to the specific subset of flight data items specified by the mobile device for decoding and display by the mobile device; and the mobile device comprising a mobile device controller configured to:

capture, using an optical code reader, a visual image of the displayed optical code;

decode, using the visual image, the displayed optical code to identify the encoded data values corresponding to the specific subset of flight data items; and cause the data values corresponding to the specific subset of flight data items to be displayed on a display on the mobile device.

\* \* \* \* \*